United States Patent [19]

Basle

[11] 4,348,555
[45] Sep. 7, 1982

[54] TELEPHONE WITH LONG DISTANCE DIALING LOCK OUT

[76] Inventor: Andrew G. Basle, 44 Athinon Ave., Halandri, Greece

[21] Appl. No.: 308,351
[22] PCT Filed: May 29, 1979
[86] PCT No.: PCT/US79/00366
  § 371 Date: Nov. 19, 1979
  § 102(e) Date: Nov. 19, 1979
[87] PCT Pub. No.: WO80/00052
  PCT Pub. Date: Jan. 10, 1980

[30] Foreign Application Priority Data
  Jun. 5, 1978 [GB] United Kingdom .............. 26334/78
  Jul. 5, 1978 [GR] Greece ..................... 56698

[51] Int. Cl.³ ..................... H04M 1/66; H04M 1/36
[52] U.S. Cl. ..................... 179/90 D; 179/189 D; 179/18 DA
[58] Field of Search .......... 179/90 D, 189 D, 18 DA

[56] References Cited
U.S. PATENT DOCUMENTS

| | | | |
|---|---|---|---|
| 3,284,578 | 11/1966 | Evans | 179/90 D |
| 3,513,271 | 5/1970 | Stathacopoulos | 179/90 D X |
| 3,761,639 | 9/1973 | Uno | 179/90 D |
| 3,832,497 | 8/1974 | Vogt | 179/90 D |
| 3,937,900 | 2/1976 | Nogakura | 179/90 D |
| 4,022,992 | 5/1977 | Kennedy | 179/90 D X |
| 4,139,741 | 2/1979 | Kennedy | 179/90 D |

FOREIGN PATENT DOCUMENTS
2037203 2/1972 Fed. Rep. of Germany.

Primary Examiner—G. Z. Rubinson
Assistant Examiner—Stafford D. Schreyer

[57] ABSTRACT

When zero on a telephone is dialed first by an unauthorized person hoping to establish a long distance line, a first blocking-spring (32) actuated by a boss (24) driven from the dial (17) arrests reverse rotation of a lug (28) before it can separate the signalling contacts (29,30) so that zero is not signalled but another digit is signalled instead. A second blocking-spring (41) is actuated by the boss as it returns to starting position for holding the first spring (32) out of engagement with the lug (28) so that a local number can be dialed.

For normal operation of the telephone, a manually operable member (39) is moved into a position in which it prevents the lug-stopping actuation of the first spring.

The telephone also can be set to prevent all outgoing calls while permitting incoming calls to be received.

9 Claims, 11 Drawing Figures

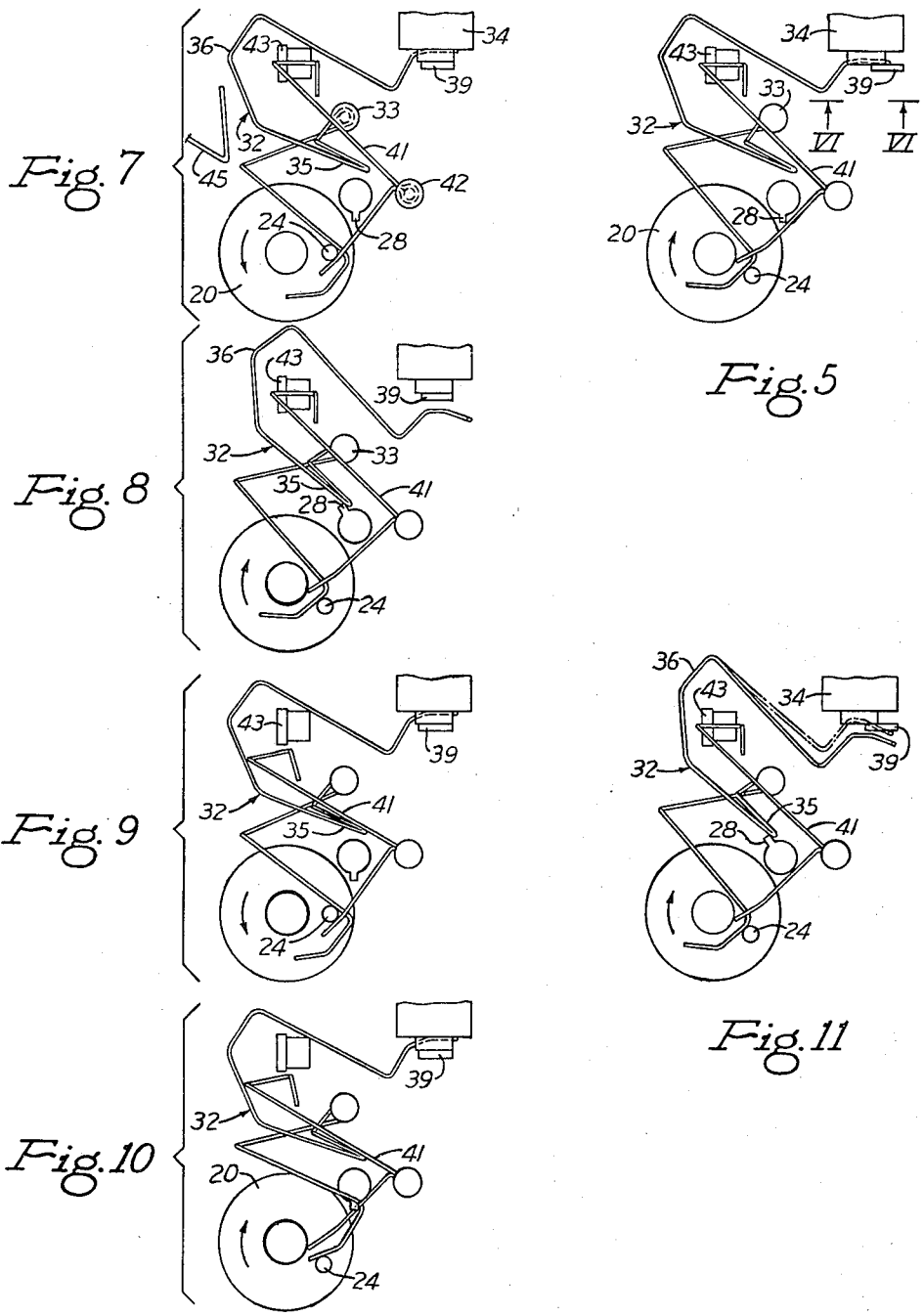

TELEPHONE WITH LONG DISTANCE DIALING LOCK OUT

In a number of countries it is necessary to dial zero first when it is desired to make a direct-dialed long distance call. Then the number being called is dialed. If the telephone is located in an area where people may have access to it who are not authorized to use it for making long distance calls for which they may not pay, there is the danger that such calls may be made. In other situations a person may wish that at times his telephone be used for incoming calls only.

It is among the objects of this invention to provide a telephone with means for selectively preventing dialing of long distance calls or preventing all outgoing calls while allowing incoming calls, and to do these things by adding only a few special elements to a dial telephone.

The preferred embodiment of the invention is illustrated in the accompanying drawings, in which FIG. 1 is a plan view of a dial telephone with the case broken away;

FIGS. 5 to 11 are upside down views illustrating the operation of the invention after the receiver has been lifted from its cradle, FIG. 5 showing the position of certain parts during dialing while the telephone is set for normal operation;

FIG. 6 is an enlarged view taken on the line VI—VI of FIG. 5;

FIG. 7 is a view similar to FIG. 5, but with the telephone set for no long distance dialing;

FIG. 8 shows zero dialed but the dial not yet released for its return movement;

FIG. 9 shows the position of the parts permitting only a local call to be made;

FIG. 10 shows a position of the parts while the local number is being dialed; and FIG. 11 shows the telephone set for incoming calls only.

The arrows on gear 20 in FIGS. 5 and 7 to 11 indicate the next direction of rotation of the gear from the position shown.

Figure 1:
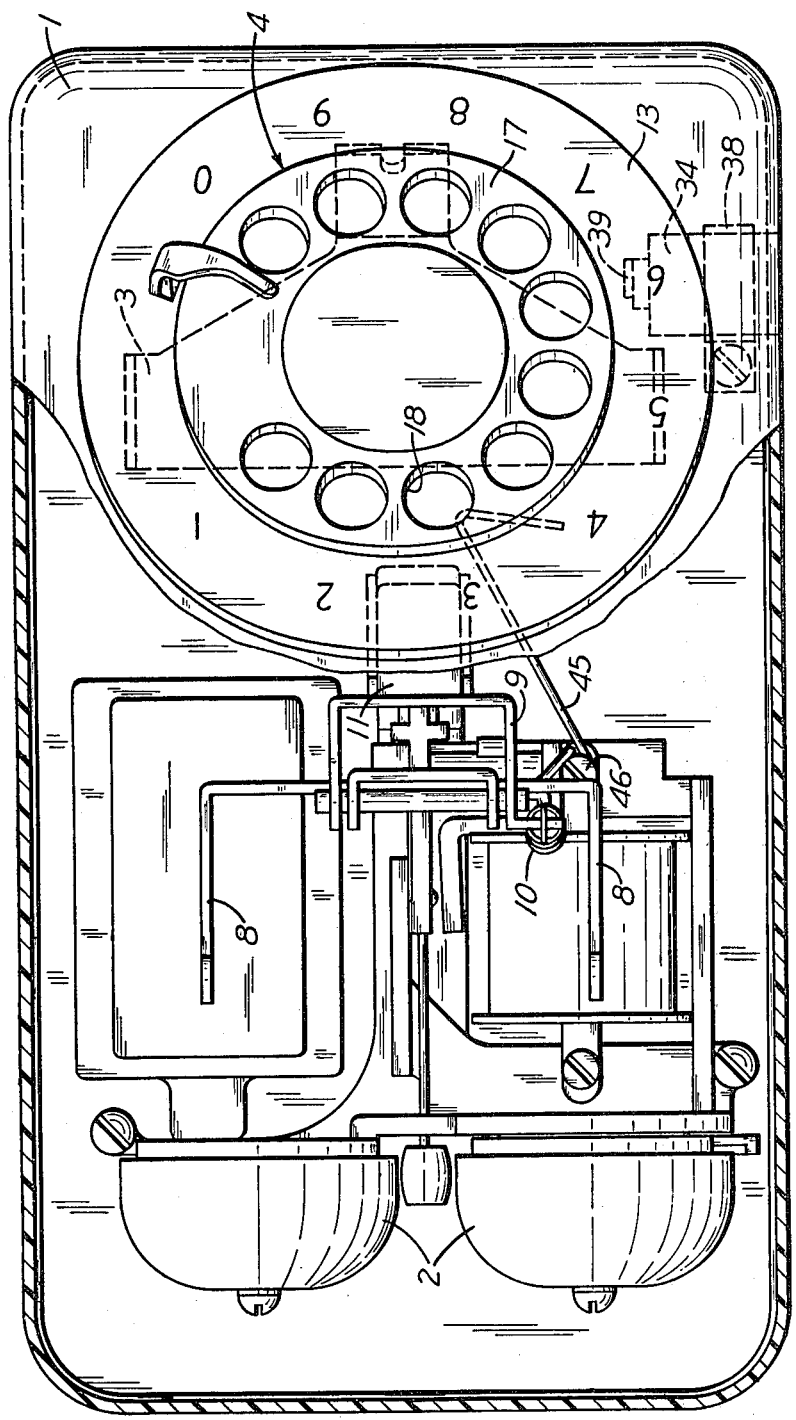
Figure 2:
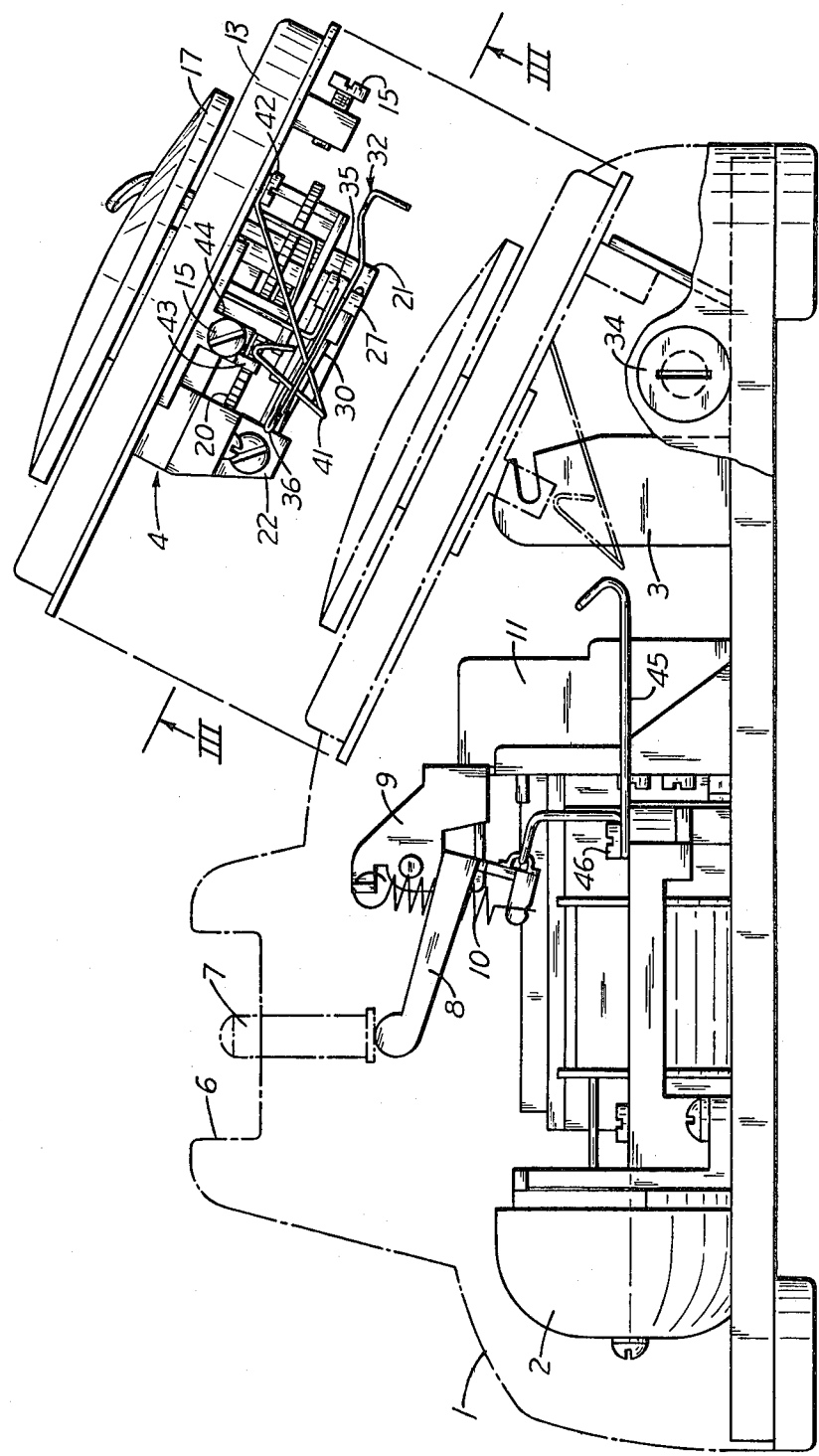
FIG. 2 is a side view with the dialing mechanism raised for the sake of clearness.

Referring to FIGS. 1 and 2 of the drawings, a conventional dial telephone has a case 1, in one end of which the usual bells 2 are mounted. In the opposite end of the case there is a stand 3 that supports the dialing mechanism 4, by which the number being called is signalled to a central office in the usual way. Between the dialing mechanism and the bells the top of the case is provided with a cradle 6 for supporting the usual receiver-transmitter unit or hand set (not shown). When in place on the cradle, this unit depresses a pair of plugs 7 that rest on the rear ends of a generally U-shape bracket 8 that is pivotally mounted on a stationary bracket 9. The rear ends of the pivoted bracket are urged upwardly by a tension spring 10 connecting the two brackets. When the hand set is in the cradle, the pivoted bracket operates electric switches in a box 11 to disconnect the hand set and to connect the bells in the circuit for incoming calls.

The dialing mechanism 4 includes a circular stationary dial base 13 rigidly mounted on a metal plate 14 (FIGS. 3 and 4) that is provided with three screws 15 for securing the plate to the supporting stand 3. A shaft 16 is journaled in the center of the dial base and extends down through the metal plate. Rigidly mounted on the upper end of this shaft is a circular dial 17 provided with the usual finger holes 18 opposite numbers or digits 1 to 0 (representing 10) on the dial base. The dial can be turned clockwise by a person's finger inserted in any of the holes and, when released, will be returned by a spring (not shown) to its original or normal position.

Figure 3:
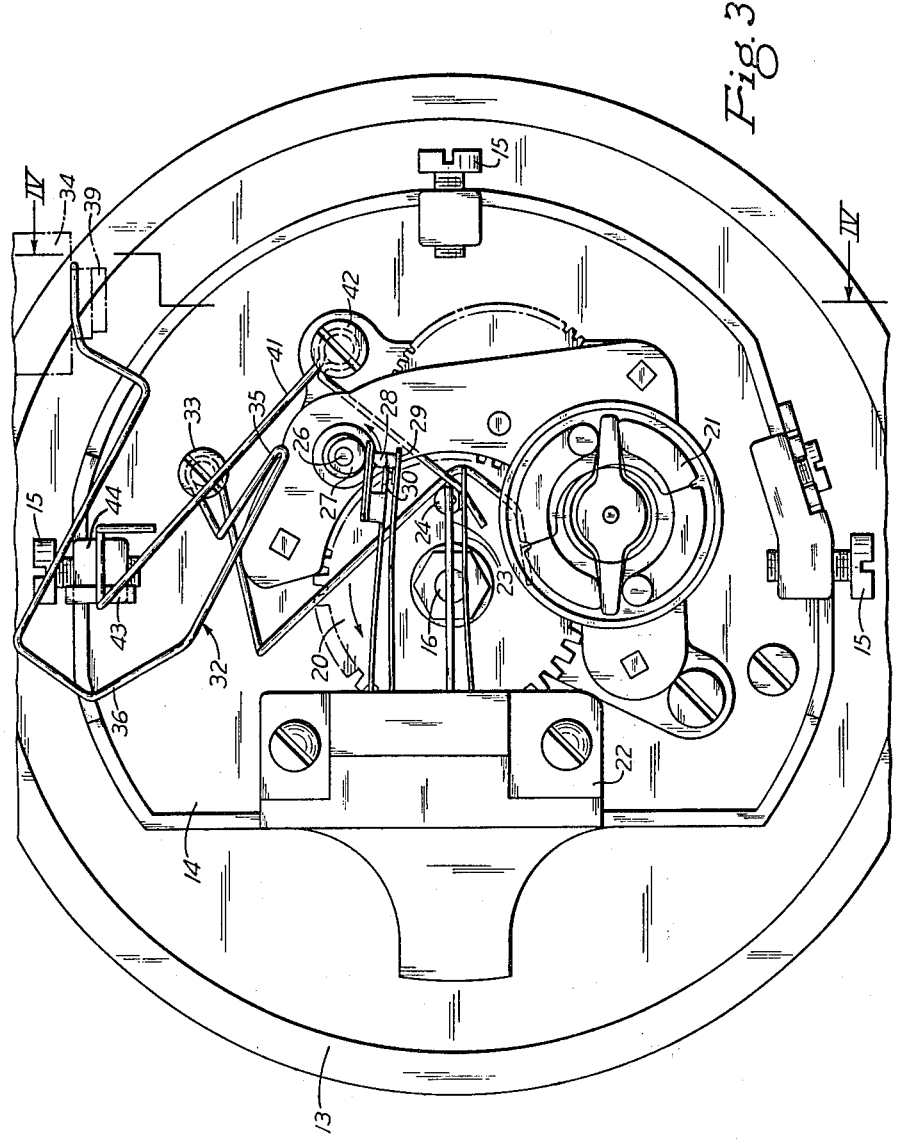
FIG. 3 is an enlarged view looking upwardly under the dialing mechanism.
Figure 4:
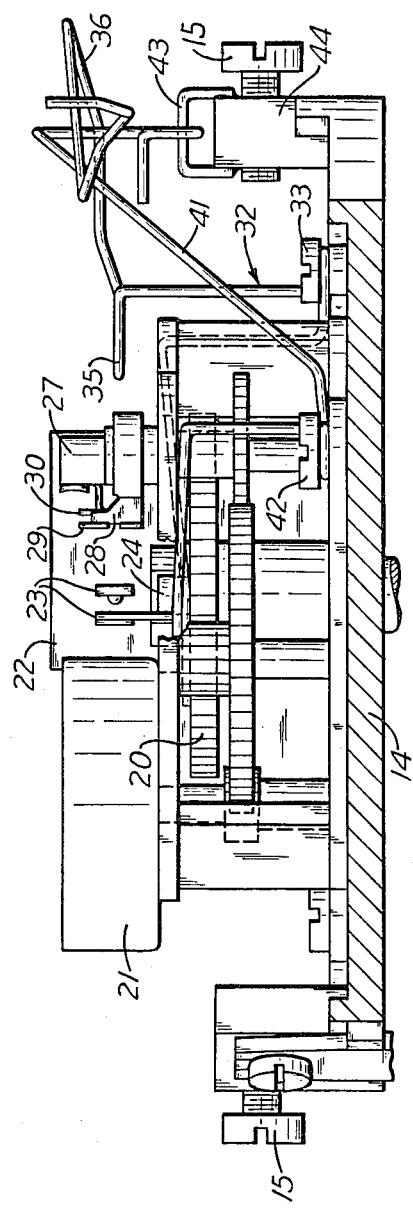
FIG. 4 is a cross section, again upside down, taken on the line IV—IV of FIG. 3.

Referring now to FIGS. 2, 3, and 4, and especially FIGS. 3 and 4 that are upside down, mounted on the lower end of the dial shaft is a large gear 20 which, through other gears turned by it, drives a governor 21 that controls the speed of the counter-clockwise or return movement of the dial. Extending across the center of the large gear from an insulating block 22 supported by metal plate 14 is a pair of spring contacts 23 that are urged toward each other. However, when the dial is in a normal resting position, a boss 24 projecting from the bottom of the gear presses against one of the spring contacts to hold it away from the other one. The moment the boss is moved away from these contacts they engage each other to close one of the electric circuits.

The large gear 20 and connected gearing also drive a shaft 26, on the lower end of which a wheel or cam 27 is rigidly mounted. Frictionally mounted on the same shaft above the cam is a laterally projecting lug 28. When the dial is in normal resting position, two spring contacts 29 and 30 supported beside the cam by means of the insulating block 22 engage each other. Both contacts are biased toward the cam shaft. When any digit is dialed, the friction between the cam shaft and the lug rotates the lug around until it is stopped by striking the contact spring 30 nearest the cam. Further rotation of the cam shaft continues to turn the cam, but the lug remains stationary. As soon as the dial is released, the cam shaft rotates the lug back around into engagement with the near side of the far contact spring 29 to prevent that spring from moving toward the cam shaft with the other contact as cam 27 revolves. As the cam revolves, it first allows contact 30 to move away from the lug-engaging contact 29 and then the cam moves it back into engagement with contact 29. This separation and re-engagement of these two contacts occurs once for every revolution of the shaft. The number of these revolutions and successive contact engagements correspond to the digit dialed (ten when zero is dialed) and signals the central office or telephone network accordingly.

The construction and operation of the telephone as described this far is conventional.

In many countries, in order to dial long distance directly, zero has to be dialed first, followed immediately by the telephone number of the party being called. In accordance with this invention, to prevent an unauthorized long distance call from being made with such a system, means are provided for preventing the central exchange from being signalled when zero is dialed first. This is done by blocking-means that arrests reverse rotation of lug 28 temporarily before it can engage contact 29 and hold it stationary while contact 30 moves away from contact 29 and back again. By preventing these contacts from separating and engaging again the full ten times, there can be no signalling of zero to the central exchange. A number other than zero is signalled in its place. However, this blocking-means operates only when zero is the first digit dialed. Additional blocking-means, actuated by boss 24 when the gear 20 returns the boss to starting position, holds the lug blocking-means out of engagement with the lug so that a local telephone number can be called as usual.

The most suitable blocking-means for the lug is a wire spring 32 bent into a peculiar configuration as shown and looped around a stud 33 screwed into metal plate 14 as shown in FIG. 3. The spring can pivot on this stud, which should exert a predetermined pressure on the spring. One end of the spring engages boss 24, which normally is between the spring and the center of gear 20. The position of the other or outer end of the spring is controlled by a key-operated lock 34 that will be described presently. The intermediate portion of the spring between the stud and lock is provided with a reversely bent portion 35 that normally is close to the path taken by lug 28 as it is rotated. Between this reversely bent portion and the outer end of the spring there is another reversely bent portion 36 for a purpose to be described.

NORMAL OPERATION

Figure 6:
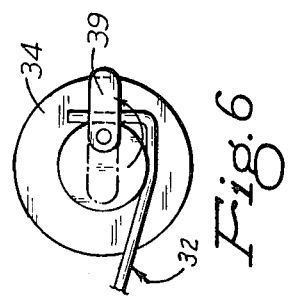

During normal operation of the telephone the outer end of spring 32 extends across the side of lock 34 near its inner end. The lock is supported by a bracket 38 (FIG. 1) inside the case but has an exposed slotted outer end that will receive a key so that the lock can be turned to rotate a prong 39 at its inner end as shown in FIGS. 5 and 6. During normal operation the prong extends laterally across the spring to prevent it from moving away from the lock. At the same time, the inner end portion of the spring is held under some tension by boss 24 engaging it. After the receiver is removed from the cradle, the dial is turned and the boss moves away from the spring, whereupon the inner end of the spring will move closer to the center of the gear. If zero is the first digit dialed, the boss will travel nearly 360° around the dial shaft and will engage the opposite side of the spring to move that end of the spring still closer to the center of the gear as shown in FIG. 5. This will merely flex the spring between the boss and stud 33, because the lock prong 39 will restrain the adjoining end of the spring and prevent the spring from pivoting on the stud. Therefore, the spring will not interfere with reverse rotation of lug 28, so both long distance and local calls can be dialed.

NO LONG DISTANCE DIALING

If it is desired to prevent long distance calls from being made, the lock 34 is operated to swing its prong 39 away from the outer end of the spring as shown in FIG. 7. Now, after the receiver is taken off the cradle, if an attempt is made to call long distance by dialing zero first, the digit usually required in such a case, the boss 24 will travel, from its illustrated starting or resting position, around the inner end of the spring and press it toward the center of the gear as shown in FIG. 8. This will swing the spring on its pivot stud 33 because the outer end of the spring is free to move inwardly away from the lock. Pivoting of the spring in this manner will swing its bent portion 35 into the path of lug 28 when it starts to turn back to its normal position upon release of the dial. With the lug arrested by the spring, but cam 27 continuing to rotate after the dial has been released, contacts 29 and 30 will not separate the usual ten times to signal a dialed zero but will move back and forth together, as they follow the movements of the cam engaging one of them, until boss 24 returning to its starting position strikes spring 32 and swings it on its pivot, as shown in FIG. 9, thereby moving it away from lug 28 so that the lug can turn again. As the lug turns, it must separate contacts 29 and 30 one or more times to signal a number 1 to 9 to the central exchange in place of zero. If that were not done, no digit would be signalled and a person could immediately dial zero a second time, which, because of the action of the second blocking means as explained in the next two paragraphs, this time would signal the central exchange that zero was dialed and thus set up a long distance call. The digit that is signalled as boss 24 returns to its starting position following the dialing of zero as the initial digit will depend upon the position of the portion of spring 32 crossing gear 20 relative to the gear. This position can be such that returning boss 24 will strike it soon enough to permit contacts 29 and 30 to separate nine times, or late enough to allow them to separate only once, which is preferred.

The second blocking-means mentioned above is designed to hold spring 32 out of engagement with lug 28 after boss 24 has struck the spring as just described, so that reverse movement of the lug will no longer be arrested as the digits in a local number being called are dialed, even a number including zero. In other words, although long distance cannot be dialed, local calls can be dialed in the usual way without interference from spring 32.

Preferable, as shown in FIGS. 2, 3 and 4, this second blocking-means consists of another bent wire spring 41, the central portion of which is provided with a loop extending around a stud 42 in metal plate 14 so that the spring can pivot on the stud, which exerts a predetermined pressure on the spring. The inner end of this spring engages boss 24 when the latter is in normal resting position. During dialing of the first digit, whether zero or not, the reversely bent outer end of the spring abuts against one side of a stop 43 to space that end portion of the spring from the portion 36 of the other spring 32. The stop preferably is attached to the downwardly projecting part 44 of plate 14 that contains one of the screws 15. When boss 24 returns to normal position after the first digit is dialed, it strikes the inner end of the second spring 41 and moves it, causing its outer end to slide across stop 43 and in against the reversely bent portion 36 of the first spring to pivot that spring on stud 33 and thereby swing it out of the path of lug 28 as shown in FIG. 9. Now, when further digits are dialed, spring 41 will prevent the first spring 32 from moving into the path of the lug and interfering with the making of local calls. This condition is illustrated in FIG. 10.

INCOMING CALLS ONLY

If it is desired to fix the telephone so that only incoming calls can be received, the outer end of the first spring 32 is moved to the opposite side of the projecting lock prong 39 so that portion 35 of the first spring will be swung into the path of reversely rotating lug 28. To move the outer end of the spring out beyond the prong, the key is turned in the lock to the no-long-distance dialing position, in which prong 39 is in its retracted position, and then zero is dialed to swing spring 32 into the path of the lug and to move the outer end of the spring away from the lock. The dial is held at zero while the key turns the lock back to the normal operating position, in which prong 39 projects from the side of the lock as shown in FIG. 11, where it will prevent the outer end of the spring from moving back onto the lock when the dial is released and boss 24 returns to normal position on the opposite side of spring 32. Movement of the outer end of the spring from the full line position to its dotted line position is not great enough to release lug 28. As boss 24 returns to normal position, it also strikes the second spring 41 and releases it from stop 43, but spring 41 cannot move the first spring out of the path of lug 28, so that no matter what digits are dialed the lug cannot return to its normal position. This prevents all outgoing calls from being made, but it does not interfere with incoming calls. To permit outgoing calls again, the lock is turned to the no-long-distance dialing position.

To engage the second spring 41 with stop 43 when the receiver is placed in the cradle, a lever 45 is provided that is operated by the pivoted bracket 8 beneath the hand set. This lever, shown in FIGS. 1, 2 and 7 is looped around a stud 46 screwed into the base and has one end that is connected to the lower part of the bracket. When the hand set is placed in the cradle, the bracket swings the lever on its pivot toward the near side of the case and causes its free end to strike spring 41 and push it across the bottom of the stop. After it has slid across the stop, the spring, by its own upward action due to the construction of its angles, pushes upwardly beside the stop just far enough to hold the spring but not so far as to prevent its later release from the stop. When the receiver is lifted from the cradle, bracket 8 swings the lever back away from the spring as shown in FIGS. 1 and 2, so that the spring can be released from the stop by boss 24 in the manner described above after a digit has been dialed. The stud 46 holding the lever must exert a predetermined tension on the lever for correct operation.

It will be seen that with this invention the person having control over this telephone can set it for normal operation, for local calls only, or for only incoming calls, thereby preventing use of the telephone for unauthorized purposes.

For convenience of description, this invention has been described as if it is necessary to dial zero first in order to set up a long distance call, but since the invention is equally applicable to situations where some other digit is the one that must be dialed first, it is intended that the claims cover whatever digit happens to be required for long distance dialing. Accordingly, zero in the claims should be read as being any digit that a particular telephone system requires to be dialed first in order to dial a long distance call.

Also, the invention has been described for convenience as applied to a dial telephone, but it should be understood that it likewise applies to other instruments utilizing the dialing of numbers to send messages long distance. Such instruments include teletype and telex machines, for example.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a telephone having a receiver-transmitter unit, a support normally holding said unit, a dial rotable forward by a finger to selected digits from 1 to 0 following removal of said unit from said support, a spring for returning the dial to a starting position after each digit is dialed, a gear driven in forward and reverse directions by the dial, a boss projecting from the gear and rotable with it in a circular path from a starting position, a pair of normally closed spring contacts, a rotable lug for separating the contacts when the gear rotates in reverse direction, a rotable cam for closing the separating contacts a different number of times for each digit dialed to signal the digit to a central office, and means driven by said gear for rotating the lug and cam in forward and reverse directions, the improvement comprising first blocking-means actuated by said boss when zero is dialed first after removal of said unit from said support for arresting reverse rotation of said lug until after the gear has returned said boss a predetermined distance toward said starting position, whereby said contacts will signal a digit other than zero, second blocking-means actuated by the boss as it moves into starting position for holding said first blocking-means out of engagement with the lug to permit a local number to be called, resetting means actuated by said unit when replaced on its support for moving said second blocking-means away from said first blocking-means, and manually operable means for preventing said lug-stopping actuation of said first blocking-means by said boss when it is desired that said contacts signal zero when zero is dialed first after removal of said unit from its support.

2. In a telephone according to claim 1, said manually operable means also being operable for actuating said first blocking-means to stop reverse rotation of said lug before it can separate said contacts, thereby to prevent all outgoing calls.

3. In a telephone according to claim 1, said first blocking-means being a pivotally mounted resilient elongated member engageable near one end by said boss when zero is dialed first to swing said member into the path of said reversely rotating lug.

4. In a telephone according to claim 3, said manually operable means including a lock provided with a prong that can be projected and retracted, one side of the prong being engageable by the opposite end of said resilient member to prevent that end from moving away from the lock when long distance dialing is desired, and the opposite side of said prong being engageable by said opposite end of the resilient member to prevent that end from moving toward the lock when no outgoing calls are to be allowed, said prong being retractable out of engagement with said resilient member when long distance dialing is to be prevented.

5. In a telephone according to claim 1, said second blocking-means being a pivotally mounted resilient elongated member engageable near one end by said boss returning to its starting position for swinging the opposite end of said member against said first blocking-means.

6. In a telephone according to claim 3, said second blocking-means being a second pivotally mounted resilient elongated member engageable near one end by said boss returning to its starting position for swinging its opposite end against said first-mentioned resilient member to prevent the latter from being turned on its pivotal mounting.

7. In a telephone according to claim 6, an abutment member holding the opposite end of said second resilient member against movement while zero is being dialed first, engagement of said boss with said one end of the second member as the boss returns to its starting position causing said opposite end of that member to be released from the abutment member, said resetting means engaging and returning said second resilient member to engagement with said abutment member when said receiver-transmitter unit is replaced on its support.

8. In a telephone according to claim 7, said resetting means including a lever actuated by said unit when replaced on its support for moving said opposite end of said second resilient elongated member back into engagement with said abutment.

9. In a telephone according to claim 3, said second blocking-means being a second pivotally mounted resilient elongated member engageable near one end by said boss returning to its starting position for swinging the opposite end portion of said second resilient member against said first-mentioned resilient member to prevent the latter from being turned on its pivotal mounting, and an abutment member holding said opposite end portion of said second resilient member against movement while zero is being dialed first, engagement of said boss with said one end of the second resilient member as the boss returns to its starting position causing said opposite end portion of that member to be released from the abutment member, said resetting means moving said second elongated member back into engagement with said abutment.

* * * * *